United States Patent Office 3,365,375
Patented Jan. 23, 1968

3,365,375
PROCESS FOR SEPARATING DECOMPOSITION PRODUCTS OF CUMENE HYDROPEROXIDE
Joseph R. Nixon, Jr., Pitman, N.J., assignor to Hercules Incorporated, a corporation of Delaware
Filed Apr. 15, 1965, Ser. No. 448,414
2 Claims. (Cl. 203—82)

ABSTRACT OF THE DISCLOSURE

The process involves distillation of cumene hydroperoxide decomposition products. The distillation is carried out in a manner which provides a substantially pure acetone fraction as overhead, an intermediate fraction of hydrocarbons and water and a bottoms product containing phenol, small amounts of water, heavy ends and trace amounts of hydrocarbons.

---

Figure 1:
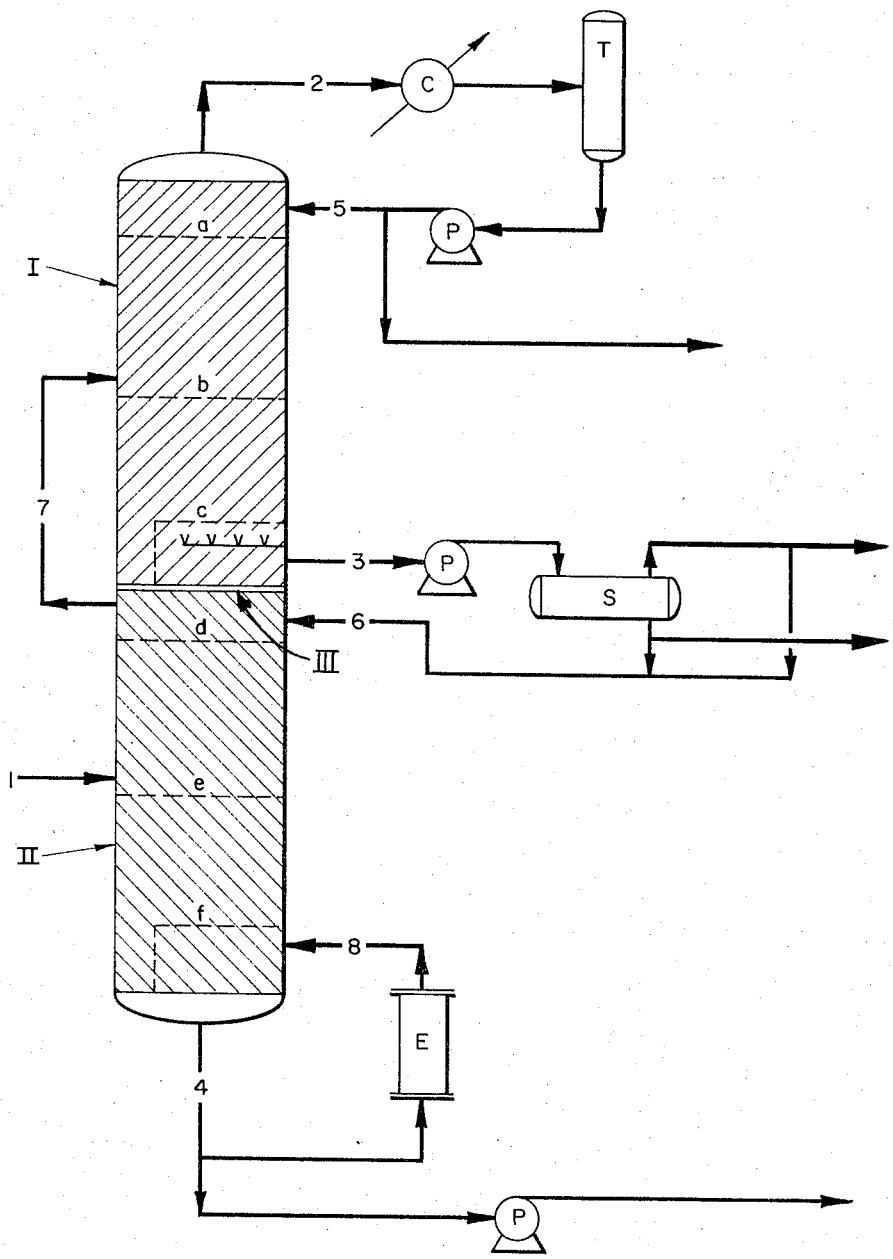

This invention relates to a process for the separation of the products obtained by catalytic decomposition of cumene hydroperoxide. More particularly it relates to an economical, efficient, and continuous process for separating such decomposition products into an acetone fraction free of phenol and hydrocarbons, a hydrocarbon fraction free of acetone and phenol, and a phenol fraction free of acetone. The invention is also particularly concerned with a process whereby an acetone fraction suitable for recycle to the cumene hydroperoxide decomposition reaction is separated in a single continuous operation from other decomposition products of cumene hydroperoxide.

The catalytic decomposition of cumene hydroperoxide results in a mixture containing, in addition to substantially equimolecular proportions of acetone and phenol, smaller amounts of hydrocarbons such as cumene and α-methylstyrene as well as other products such as cumylphenol, dimethylphenyl carbinol, acetophenone and polymers of α-methylstyrene. A quantity of water is also contained in the resulting mixture.

A number of processes have hitherto been described in the art for effecting the separation of these products, such processes depending, in most cases, upon the differences in the boiling points of the various components to effect their separation by distillation. Invariably, where these prior art methods have been employed, a desirable degree of separation of the components has not been attained, and purification of the resultant contaminated fractions has necessitated further expenditures for initial investment and operating costs.

Now in accordance with the present invention, a process has been found for separating cumene hydroperoxide decomposition products by distillation which obviates the aforementioned undesirable features of the methods currently in use. The process comprises subjecting the cleavage mixture containing acetone, phenol, hydrocarbons, heavy ends (e.g., cumylphenol, dimethylphenylcarbinol, acetophenone), and water to distillation in a single multiple plate-type distillation tower divided into two substantially independent distillation zones by a horizontal baffle plate located in the middle section of the tower. By proceeding in accordance with this process it is possible to withdraw substantially pure acetone containing at most about 1% of water from the head of the column, to withdraw hydrocarbons and water, both free of acetone and phenol, from an intermediate point of the column, and from the base of the column to withdraw phenol containing small amounts of water and heavy ends and trace amounts of hydrocarbons. Acetone and hydrocarbon fractions suitable for use in subsequent operations without further purification are thus obtained by a continuous process employing a single distillation tower, concomitant saving of expenditures for multiple towers, auxiliary equipment, steam, etc. being realized thereby.

The method of operating in accordance with this invention may be illustrated by reference to the attached drawing, FIG. 1, which shows a sectional distillation column having numerous plates and provided with the conventional accessories, which are more particularly, the evaporator E for supplying the necessary heat to the bottom of the column, the condenser C for condensing the vapors leaving the column, the tank T for collecting the acetone product, the separating tank S for decanting the water and the hydrocarbons collected at an intermediate point, and the pumps P, installed where they are needed.

To simplify the description, only those plates contained in the column which are situated in significant positions are depicted; they are designated by the letters a, b, c, d, e and f. It is to be understood, of course, that in the actual column numerous other plates are located among those which are designated. A baffle plate III located horizontally between plates c and d separates the column into what may be regarded as an enriching zone and a stripping zone designated in the drawing by the Roman numerals I and II respectively, the plate designated c being the bottom plate in zone I, and that designated d being the top plate in zone II. The liquid to be treated is supplied through the pipe 1, the products are withdrawn from the column through the pipes 2, 3 and 4, pipes 5 and 6 each carry reflux streams, and the numerals 7 and 8 represent pipes through which vapors flow.

Plate e, located about midway in zone II, receives through pipe 1, the products of the cumene hydroperoxide decomposition reaction, freed from the decomposition catalyst employed. As this mixture runs downward over the lower plates, it is contacted with the rising vapors of the sump product, which vapors are introduced below plate f, the lowest plate in the column. These sump product vapors are generated by the exchange of heat from high pressure steam supplied to the evaporator E. As the vapors continue to rise through zone II, they come into further contact with a countercurrent stream of water and hydrocarbons which is furnished to plate d from the concurrent separation effected in zone I. Thus, the downward flowing stream in zone II becomes progressively more deficient in acetone and hydrocarbons and richer in phenol and heavy ends, resulting in a sump product containing essentially all of the phenol introduced into the column, along with water, heavy ends, and minor amounts of hydrocarbons, the effluent withdrawn from the bottom of zone II at 4 containing no acetone at all. Conversely, the vapors progressing upward become increasingly rich in acetone and hydrocarbons and poorer in the higher boiling fractions, phenol and heavy ends. Ultimately, this rising vaporous stream is substantially completely purged of the high boiling constituents, allowing essentially pure vapors of hydrocarbons, acetone, and water to be conveyed by way of pipe 7 to zone I.

It is to be noted that it is at this point that significant savings in steam are realized as compared to conventional methods of distillation. As is mentioned above, the overhead products of zone II are conducted to zone I while still in vaporous form. This makes possible further separation of the components by distillation without the necessity of an additional charge of steam normally required to provide the heat of vaporization of such overhead products.

The overhead products of zone II, consisting of vapors of water, hydrocarbons, and acetone, are carried via pipe 7, which may suitably be a conduit either internal or external to the column, and introduced at plate b, located about midway in zone I of the column. These products are contacted with steam rising from below plate c (instead of introducing steam below plate c, a reboiler could be used), provided to maintain the vaporous state of the acetone, and with a reflux stream consisting almost entirely of acetone but containing a small amount of water, flowing countercurrently from plate a, which is the topmost plate in zone I.

Contact of these streams results in an overhead product containing at most 1% of water and at least 99% of acetone, and a bottoms product consisting of the remainder of the water and all of the hydrocarbons introduced into zone I.

The bottoms products of zone I thus recovered are thereupon conducted through pipe 3 to tank S where they readily separate into an aqueous and an organic layer. Portions of these layers are then carried by way of pipe 6 to zone II where they are utilized as reflux for distillation in that zone. The portions not so utilized are collected, the hydrocarbons as product which may be distilled to recover cumene and α-methylstyrene, free of acetone, and the water, substantially free of phenol and acetone, which may either be discarded or employed in subsequent operations.

The overhead product from zone I is carried via pipe 2 to condenser C and then to tank T, from which a portion is returned through pipe 5 to zone I where it is used as reflux. The remaining overhead product may be subjected to further operations to completely dry and/or purify the acetone and render it more suitable for commercial sale.

An example of such a further operation is extractive distillation, whereby fractionation is facilitated by the addition of a solvent which changes the volatility of the components. If such a distillation is not to be prohibitively expensive, the hydrocarbon concentration in the acetone feed must be very low or nil. The overhead acetone product of the present invention is thus eminently suitable for extractive distillation, there being essentially no hydrocarbon contained therein. With regard to an alternative treatment, it is recognized that the quality, sweetness, and the permanganate time of acetone produced by the cleavage of cumene hydroperoxide can be improved by subjection of the acetone to a caustic wash prior to final distillation. When there is a large amount of water contained in the feed, such a caustic wash is impractical due to the resultant prohibitive loss of acetone as well as the large amount of caustic required to maintain it at a sufficiently high concentration. The acetone produced in accordance with this invention, being virtually dry, thus is also well suited for this beneficial caustic treatment. As an additional alternative, and one which represents a most beneficial aspect of this invention, a portion of the condensed overhead product may be routed to the cumene hydroperoxide cleavage reaction for use as recycle acetone. In this application, the overhead acetone product may be used directly, without further processing, the unusually low concentration of water remaining with the acetone being insufficient to detrimentally affect the cleavage reaction.

The number of plates contained in the column and the reflux ratios employed in the practice of this invention need not be confined to those given in the example which follows, but may be varied within wide limits. The example following is provided only to illustrate the invention; no unnecessary limitations are intended thereby nor should any be inferred therefrom.

All rates are given in parts per hour, and all percentages are by weight.

*Example*

A distillation column containing 55 plates is provided in which, with reference to FIG. 1, plate 1 is represented by a, plate 19 by b, plate 25 by c, 26 by d, 48 by e, and 55 by f. It is equipped with the conventional accessories depicted and hereinbefore described. A baffle III located between plates 25 and 26 separates the column into two zones, corresponding to zones I and II shown in the drawing.

One hundred parts per hour of the catalyst-free cumene hydroperoxide cleavage product is introduced at 1 onto plate 48. This feed is composed of 45.3% acetone, 11.6% water, 4.8% hydrocarbons, 35.6% phenol, and 2.7% heavy ends.

Live steam is introduced below plate 25 at the rate of 8.6 parts per hour, and high pressure steam is provided to the evaporator at the rate of 67 parts per hour. This is equivalent to a heat furnish of about 1944 B.t.u.'s per pound of acetone introduced and separated.

A ratio of four parts of reflux per part of distillate removed from the process is employed in zone I. Acetone, comprising 99% of the effluent at 2, the remainder being water, is removed from the process at a rate corresponding to that of its introduction, i.e., 45.3 parts per hour.

The stream flowing from the bottom of zone I at 3 contains only hydrocarbons and water. After separation of these products by decantation in tank S, 4.6 parts of hydrocarbons and 16.9 parts of water are recovered from the process per hour. The remainder, comprising 46 parts per hour of hydrocarbons and 19.5 parts per hour of water, is returned to plate 26 of zone II as reflux.

The portion of effluent at 4, which is not returned to the evaporator E, amounts to 41.3 parts per hour. This sump product is composed of 86.2% phenol, 6.8% water, 0.5% hydrocarbons, and 6.5% heavy ends.

The vapor, carried from zone II to zone I by pipe 7 at the rate of 124.2 parts per hour, is composed of 36.5% acetone, 22.8% water and 40.7% hydrocarbons. Since no phenol is carried from zone II to zone I, it is found that even the most sensitive tests fail to detect any trace of phenol in the overhead acetone product withdrawn from zone I.

Figure 2:
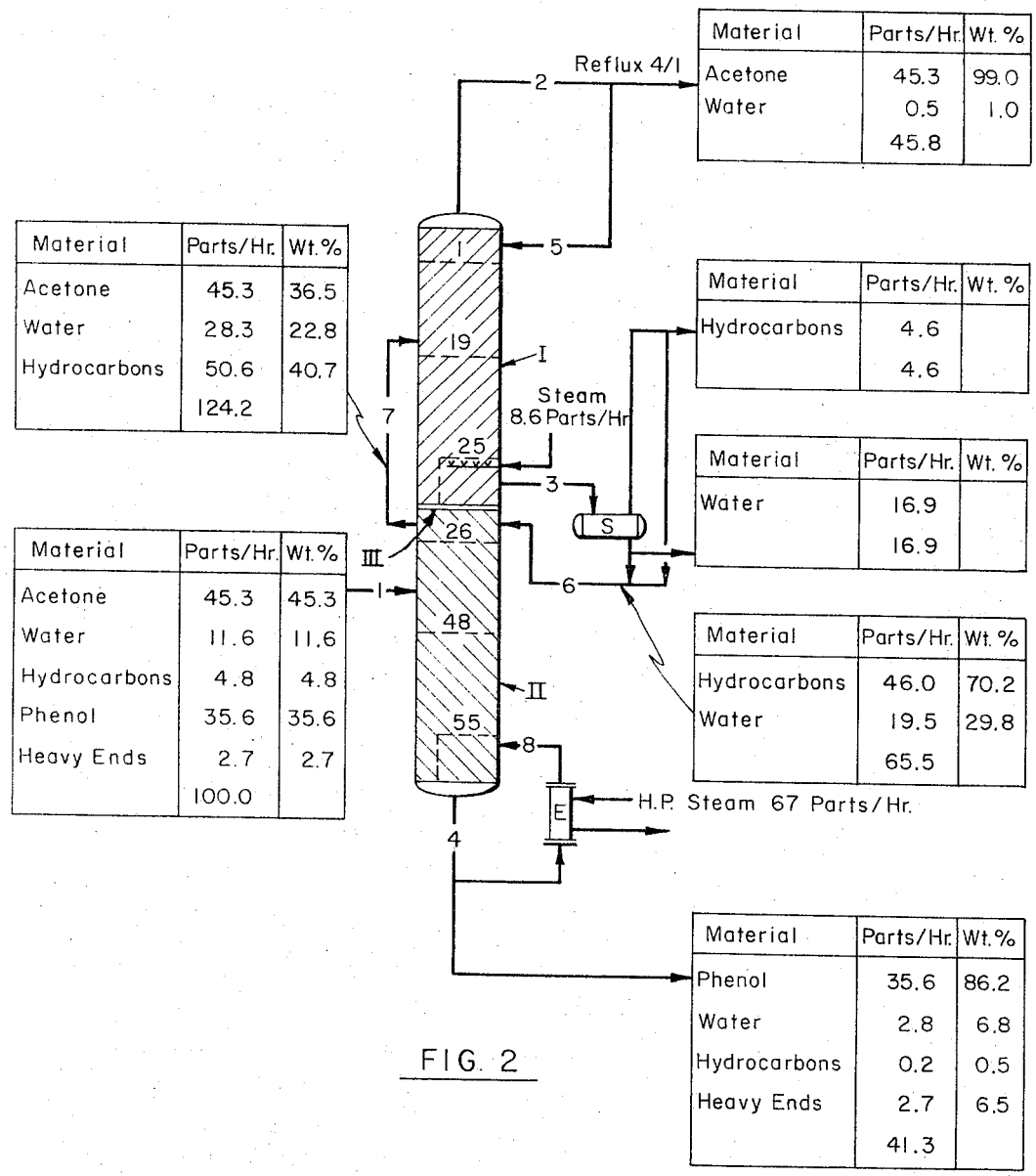

Reference to FIG. 2 will give a clear illustration of the compositions and the flow rates of the various above-mentioned streams.

As is apparent from the preceding example and the drawings discussed therein, a horizontal baffle plate is located approximately in the middle of the distillation column employed. In other words, the baffle plate is positioned in a plane perpendicular to the long axis of the column. Moreover, this plate may be located in other positions as long as it is at least one third of the way but not more than two thirds of the way from the base to the head of the column. That is to say that, based on the total length of the column, the baffle plate may be located at any point between a point at least one third from the head of the column and a similar point at least one third from the base of the column.

What I claim and desire to protect by Letters Patent is:

1. A process for separating the decomposition products of cumene hydroperoxide, including acetone, phenol, water, cumene, α-methylstyrene, cumylphenol, dimethylphenylcarbinol and acetophenone, in a single multiple plate-type distillation column containing two substantially independent distillation zones which are directly interconnected only by a conduit between the head of the lower distillation zone and an intermediate point of the upper distillation zone, which process comprises continuously introducing said decomposition products at an intermediate point of the lower distillation zone, conducting vapors of acetone, hydrocarbons and water from the head of the lower distillation zone through said conduit to an intermediate point of the upper distillation zone, withdrawing substantially pure acetone from the head of the upper distillation zone, returning a portion of said acetone to said upper distillation zone as reflux, withdrawing a decantable mixture of water and the hydrocarbons from a point at the base of the upper distillation zone, said mixture being substantially free of acetone and phenol and said hydrocarbons comprising cumene and α-methylstyrene, separating said decantable mixture into a water fraction and a hydrocarbon fraction, returning portions of said fractions to the lower distillation zone as reflux, and withdrawing from the base of the column a mixture of phenol with water, cumylphenol, dimethylphenylcarbinol and acetophenone, but containing no acetone and being substantially free of cumene and α-methylstyrene.

2. A process in accordance with claim 1 wherein the substantially pure acetone withdrawn from the head of the upper distillation zone is recycled for use in the catalytic decomposition reaction of cumene hydroperoxide.

References Cited
UNITED STATES PATENTS

| | | | |
|---|---|---|---|
| 2,073,446 | 3/1937 | Ellsberg | 203—74 |
| 2,552,451 | 5/1951 | Patterson | 62—31 |
| 2,672,434 | 3/1954 | MacFarlane | 203—74 |
| 2,824,049 | 2/1958 | Maincon et al. | 260—621 |
| 2,862,855 | 12/1958 | Lang et al. | 260—621 |
| 3,216,909 | 11/1965 | Bress | 202—154 |
| 3,246,478 | 4/1966 | Kornemann | 62—29 |
| 3,265,592 | 8/1966 | Van Der Weel | 203—97 |

WILBUR L. BASCOMB, Jr., *Primary Examiner.*